US012055895B2

(12) United States Patent
Denden

(10) Patent No.: US 12,055,895 B2
(45) Date of Patent: Aug. 6, 2024

(54) RETROGRADE TIMEPIECE DISPLAY MECHANISM PROVIDED WITH A SAFETY DEVICE

(71) Applicant: Blancpain SA, Le Brassus (CH)

(72) Inventor: Mehdi Denden, Les Rousses (FR)

(73) Assignee: Blancpain SA, Le Brassus (CH)

( * ) Notice: Subject to any disclaimer, the term of this patent is extended or adjusted under 35 U.S.C. 154(b) by 666 days.

(21) Appl. No.: 17/198,341

(22) Filed: Mar. 11, 2021

(65) Prior Publication Data

US 2021/0364989 A1 Nov. 25, 2021

(30) Foreign Application Priority Data

May 20, 2020 (EP) .................................... 20175724

(51) Int. Cl.
*G04B 19/02* (2006.01)
*G04B 19/08* (2006.01)
*G04B 27/00* (2006.01)

(52) U.S. Cl.
CPC ........... *G04B 19/02* (2013.01); *G04B 19/082* (2013.01); *G04B 27/004* (2013.01); *G04B 27/005* (2013.01)

(58) Field of Classification Search
CPC .... G04B 19/02; G04B 19/082; G04B 27/004; G04B 27/005
See application file for complete search history.

(56) References Cited

U.S. PATENT DOCUMENTS 7,625,116 B2 * 12/2009 Bron ...................... G04B 19/02 368/106
9,448,534 B2 * 9/2016 Goeller .............. G04B 19/2538
(Continued)

FOREIGN PATENT DOCUMENTS

CH 711 184 A2 12/2016
CN 101236402 A 8/2008
(Continued)

OTHER PUBLICATIONS

Japanese Office Action issued Apr. 12, 2022 in Japanese Patent Application No. 2021-062632 (with English translation), 8 pages.
(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A retrograde timepiece display mechanism for a watch including a wheel for displaying information, this display wheel being driven by a drive finger carried by a wheel driven by a horological movement, in order to change the information displayed by the retrograde timepiece display mechanism from one value to the immediately following value, this retrograde timepiece display mechanism including also an intermediate correction device to manually correct the information provided by the retrograde timepiece display mechanism by acting on a correction finger which drives the display wheel, the retrograde timepiece display mechanism also including a safety device arranged to allow blocking the intermediate correction device by preventing the correction finger from driving the display wheel during a period of time when the change in the information displayed by the retrograde timepiece display mechanism occurs and when the drive finger is engaged with the display wheel.

25 Claims, 8 Drawing Sheets

(56) References Cited

U.S. PATENT DOCUMENTS

| | | | | |
|---|---|---|---|---|
| 10,928,777 | B2 * | 2/2021 | Gerber | G04B 19/02 |
| 11,003,139 | B2 * | 5/2021 | Gerber | G04B 19/065 |
| 2008/0106979 | A1 | 5/2008 | Bron et al. | |
| 2019/0086867 | A1 * | 3/2019 | Gerber | G04B 19/02 |
| 2019/0332059 | A1 * | 10/2019 | Gerber | G04B 19/082 |

FOREIGN PATENT DOCUMENTS

| | | | |
|---|---|---|---|
| CN | 102968042 | A | 3/2013 |
| EP | 1 134 627 | A1 | 9/2001 |
| EP | 1 918 792 | A1 | 5/2008 |
| EP | 3 144 743 | A1 | 3/2017 |
| JP | 58-160370 | U | 10/1983 |

OTHER PUBLICATIONS

Combined Chinese Office Action and Search Report issued May 23, 2022 in Patent Application No. 202110554602.1 (with English translation of Category of Cited Documents), 8 pages.

European Search Report issued Nov. 9, 2020 in European Application 20175724.2 filed May 20, 2020 (with English Translation of Categories of Cited Documents), 4 pages.

* cited by examiner

RETROGRADE TIMEPIECE DISPLAY MECHANISM PROVIDED WITH A SAFETY DEVICE

CROSS-REFERENCE TO RELATED APPLICATION

This application claims priority to European Patent Application No. 20175724.2 filed on May 20, 2020, the entire disclosure of which is hereby incorporated herein by reference.

TECHNICAL FIELD OF THE INVENTION

The present invention relates to a retrograde timepiece display mechanism provided with a safety device. More specifically, the present invention provides a retrograde date display mechanism provided with such a safety device.

TECHNOLOGICAL BACKGROUND OF THE INVENTION

A timepiece display mechanism is said to be retrograde which, when it reaches a certain point, sets back and returns to its starting point. Among the retrograde timepiece display mechanisms that are known, mention can in particular be made of date display mechanisms, an example of which is given by a hand which displaces facing an index on which appear the date indications of "1" to "31". The hand points successively to each of the date indications "1" to "31" then, when at the end of the month, it arrives at the date indication "31", it is returned backwards and brought back facing the date indication "1". Then, the hand begins to displace again facing the date indications from "1" to "31".

In most retrograde timepiece display mechanisms, the transmission of movement from one component to the next component and to a retrograde display member is achieved by means of rigid elements such as cams or racks. When the owner of a watch equipped with such a retrograde timepiece display mechanism wants to make a correction of the current time displayed by his watch, this correction can only be carried out in the direction of forward movement of the current time, and not in the direction of backward movement, which is problematic.

To meet the demand for watches comprising retrograde timepiece display mechanisms which do not prevent the possibility of correcting the current time displayed by the watch in both directions, such retrograde timepiece display mechanisms have already been proposed wherein the transmission of movement from one component to another and to the retrograde display member involves flexible elements such as a flexible finger. Owners of watches wherein such retrograde timepiece display mechanisms are integrated are therefore offered the possibility of correcting the current time indication provided by their watch in both directions, that is to say both in the forward direction and in the backward direction.

Whether it is in one direction only or in both directions, the correction of the current time displayed by a watch equipped with a retrograde timepiece display mechanism is, nevertheless, not without problems. In the case, for example, where a flexible element such as a flexible finger is in the kinematic chain for transmitting the movement of a retrograde timepiece display mechanism, it is understood that if, at the moment when the flexible finger is engaged with the component that it must drive to ensure the displacement of the retrograde display member from one indication to the next indication in the forward direction, the owner of the watch begins to manually correct the information displayed by the display member, there is a great risk that the owner of the watch will force the flexible element and damage it, or even break it, thus putting the watch movement out of service, which is not acceptable. Indeed, in this situation, the flexible finger will be forced in the direction opposite to the direction wherein it drives the component with which it is engaged to ensure the displacement of the retrograde display member, and it thus risks plastically deforming, or even breaking.

The problem is of the same order in the case of retrograde timepiece display mechanisms where the transmission of the movement is achieved by means of rigid elements. Indeed, if the owner of the watch tries to manually correct the indication provided by the retrograde timepiece display mechanism at the moment when the horological movement drives this retrograde timepiece display mechanism, manual correction will be impossible, but nothing is intended to prevent the owner of the watch from forcing the correction mechanism, and therefore risking damage to his watch.

There was therefore in the prior art a need for a device allowing to protect a retrograde timepiece display mechanism against an attempt to manually correct the display when an element located in the kinematic chain for transmitting the movement of the retrograde timepiece display mechanism is engaged with the component that it must drive to ensure the operation of this retrograde timepiece display mechanism.

SUMMARY OF THE INVENTION

The purpose of the present invention is to provide a safety device allowing the owner of a watch to manually correct the indication provided by a retrograde timepiece display mechanism while protecting this retrograde timepiece display mechanism against any attempt of manually correcting the information that it displays during the period of time when the change in the information displayed by the retrograde timepiece display mechanism occurs.

To this end, the present invention relates to a retrograde timepiece display mechanism for a watch comprising a wheel for displaying information, this display wheel being driven at regular time intervals by a drive finger carried by a drive wheel in turn driven by a horological movement, in order to change the information displayed by the retrograde timepiece display mechanism from one value to the immediately following value, this retrograde timepiece display mechanism comprising also an intermediate correction device which allows the owner of the watch to manually correct the information provided by the retrograde timepiece display mechanism by acting on a correction finger which drives the display wheel, the retrograde timepiece display mechanism also comprising a safety device arranged to allow blocking the intermediate correction device by preventing the correction finger from driving the display wheel during a period of time when the change in the information displayed by the retrograde timepiece display mechanism occurs and when the drive finger is engaged with the display wheel.

According to special embodiments of the invention:

- the drive finger is rigid;
- the drive finger is flexible;
- the display wheel is elastically stressed in the direction opposite to its driving by a first spring, this elastic tension being retained by means of a wheel mounted fixedly coaxially with the display wheel and into a toothing of which a retaining means mounted on the display wheel is elastically pressed;

the retaining means is an elastically stressed jumper provided with a beak which is pressed into the toothing of the display wheel;

the retaining means is a finger elastically stressed by a jumper and provided with a beak which is pressed into the toothing of the display wheel;

the drive finger consists of a beak engaged in a toothing of the display wheel and extended by at least one elastic coil which ends in means allowing a free end of the elastic coil to be secured to the drive wheel which carries the drive finger;

the drive finger fixing means comprise a radial arm pierced with a hole allowing the flexible drive finger to be secured to a pivot axis of the drive wheel which carries it;

the flexible drive finger is rotatably mounted coaxially between the drive wheel and a circular plate freely mounted on the drive wheel and in a perimeter of which a notch is formed, and a pin is fixed in the beak of the flexible drive finger, this pin is protruding, at a first end, in an oblong hole formed in a board of the drive wheel, and at a second end, in the notch;

the flexible drive finger is mounted on the drive wheel pre-stressed so that the pin is constantly supported against a wall of the oblong hole;

an eccentric is fixed in the board of the drive wheel so that its angular position can be adjusted and positioned so that it ends up in a clearance formed in the perimeter of the circular plate;

the circular plate is surmounted by a cam mounted integral on this circular plate, a feeler-spindle of the safety device resting on this cam to make impossible any attempt of manual correction of the information displayed by the retrograde timepiece display mechanism when the flexible drive finger is engaged with the display wheel;

a correction device, actuated by the owner of the watch, acts on an intermediate correction device so that a correction finger engages in the toothing of the display wheel and moves the latter forward only when the flexible drive finger is not engaged with the display wheel;

the correction device comprises a control lever which pivots when the owner of the watch pushes on this control lever, this control lever being provided with a correction pin which moves a third spring of the intermediate correction device away from its rest position, this third spring being fixed on a correction lever which, by pivoting, in turn rotates the correction finger against the elastic return force of a fourth spring, so that the correction finger moves the display wheel forward only when the flexible drive finger is not engaged with the display wheel, the safety device comprising to this end a pivotally mounted fork to which the correction lever is coupled and which is provided with the feeler-spindle;

the drive wheel which carries the flexible drive finger may be a 24-hour wheel, and the retrograde timepiece display mechanism then allows the date indications to be displayed.

Thanks to these features, the present invention provides a retrograde timepiece display mechanism which allows the owner of the watch wherein this retrograde timepiece display mechanism is embedded to manually correct the indication provided by the latter without risk that the owner of the watch could break this retrograde timepiece display mechanism. To this end, the present invention intends to provide the retrograde timepiece display mechanism with a safety device making inoperative any attempt by the owner of the watch to manually correct the display provided by the retrograde timepiece display mechanism during the period of time when the horological movement drives this retrograde timepiece display mechanism and when the drive finger engages the display wheel to change the information displayed. Thus, any risk of driving the display wheel in the direction opposite to the direction wherein the drive finger drives this display wheel during the period of time when these two components are engaged with each other, and therefore breaking the mechanism, is discarded.

BRIEF DESCRIPTION OF THE FIGURES

Other features and advantages of the present invention will emerge more clearly from the detailed description which follows of an embodiment of a retrograde timepiece display mechanism, this example being given purely in an illustrative and non-limiting manner only in conjunction with the appended drawing on which.

DETAILED DESCRIPTION OF AN EMBODIMENT OF THE INVENTION

In what follows, care will be taken to distinguish between a change in the information displayed by the retrograde timepiece display mechanism which is induced by the normal operation of the horological movement as time passes, and a change in the information displayed by the retrograde timepiece display mechanism which results from a manual correction performed by the owner of the watch by means of the manual correction device.

The present invention proceeds from the general inventive idea which consists in providing a retrograde timepiece display mechanism embedded in a watch and equipped with a safety device allowing to guarantee that at no point the owner of the watch runs the risk of forcing the retrograde timepiece display mechanism and breaks it by wanting to perform a manual correction of the displayed indication. To this end, the present invention teaches to provide the retrograde timepiece display mechanism with a safety device aiming at making it impossible to manually correct the information displayed by this mechanism during the period of time when this retrograde timepiece display mechanism is driven by the horological movement and when the information displayed changes automatically.

The present invention will be described in connection with a retrograde timepiece display mechanism providing a date indication. It goes without saying that this example is given in a purely illustrative and non-limiting manner only and that the present invention can be applied to other timepiece display mechanisms arranged to display time information (for example days of the week or else months of the year) in a retrograde manner.

Figure 1:
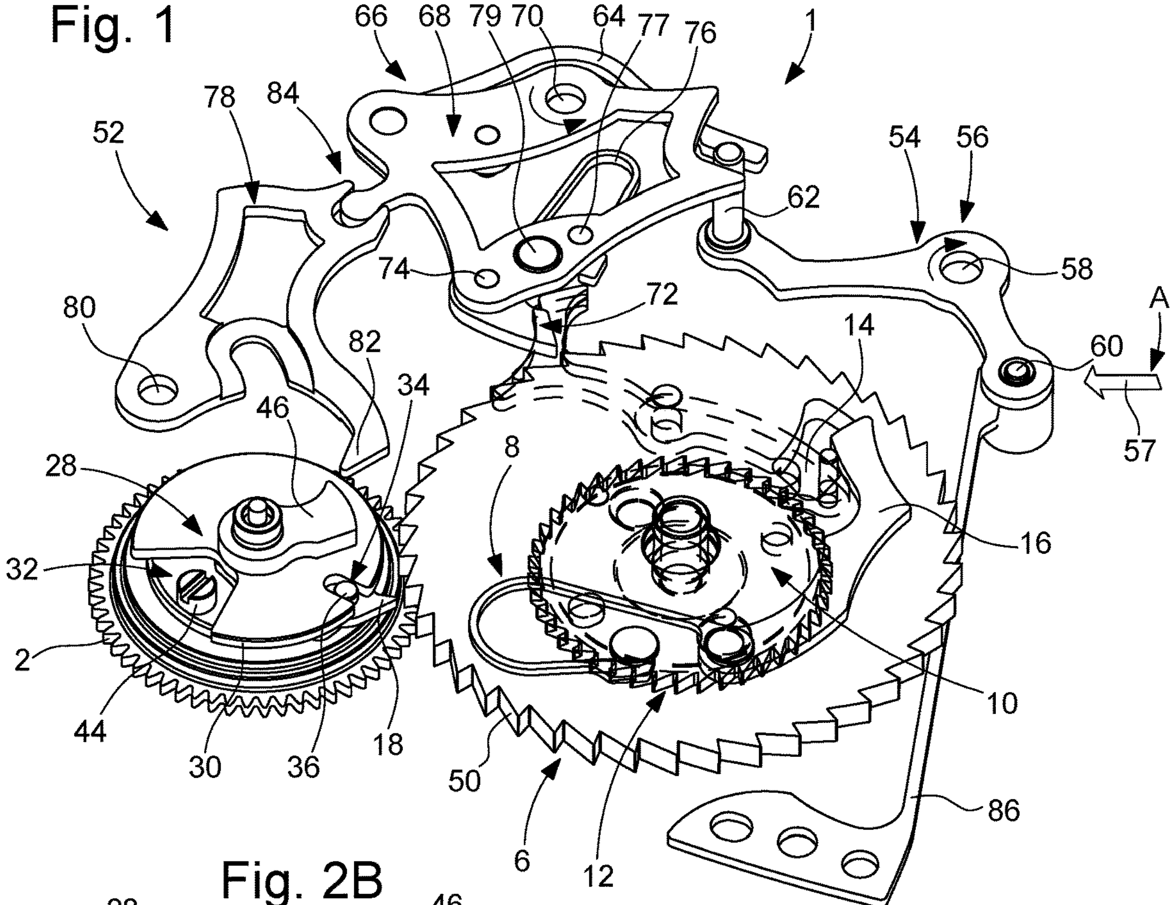
FIG. 1 is a top perspective view of the retrograde timepiece display mechanism according to the invention.
Figure 3:
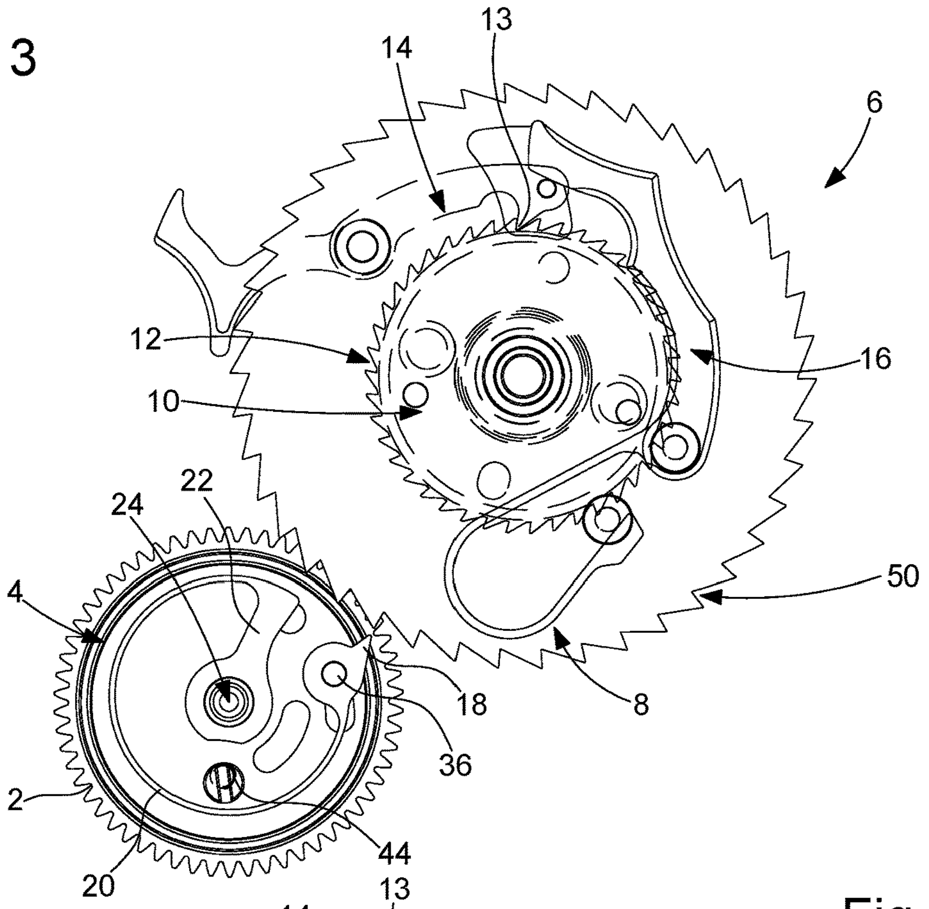
FIG. 3 is a top view of the assembly formed by the 24-hour wheel and by the display wheel shortly before the 24-hour wheel begins to drive the display wheel via its flexible drive finger.

Designated as a whole by the general reference numeral 1, the retrograde timepiece display mechanism according to the invention as illustrated in FIG. 1 comprises a drive wheel 2 which carries a drive finger 4 (see in particular FIG. 3). Driven in the counterclockwise direction by a horological movement of the watch not shown in the drawing, the drive wheel 2 is also called the 24-hour wheel because it makes one complete revolution in 24 hours. In turn, the drive wheel 2 drives a display wheel 6 in the clockwise direction by its drive finger 4. In the particular and non-limiting case where the retrograde timepiece display mechanism which is of interest here is provided to display the date indications, the display wheel 6 moves one step forward per day and the drive wheel 2 performs a complete revolution in 24 hours. It will nevertheless be understood that this example is given for purely illustrative and non-limiting purposes only and that other indications can be displayed, so that the speed of rotation of the drive wheel 2 may be different from 24 hours. For example, the drive wheel 2 will make a complete revolution in 7 days if the retrograde timepiece display mechanism 1 according to the invention is used to display the days of the week. Or else the drive wheel 2 will make a complete revolution in 31 days if the display mechanism according to the invention is intended to display the months of the year.

Moreover, the display wheel 6 is elastically stressed in the counterclockwise direction, that is to say the direction opposite to its driving, by a first spring (not shown in the drawing). This elastic tension is retained by means of a wheel 10 mounted fixedly coaxially with the display wheel 6 and in a toothing 12 of which a first beak 13 of a retaining finger 14 is pressed against by a jumper 16 stressed by a second spring 8.

According to a particular embodiment of the invention not shown in the drawing, the retaining means which elastically stresses the display wheel 6 may be the jumper 16 itself which is provided with a beak by which it is pressed into the toothing 12 of the display wheel 6.

According to a preferred but non-limiting embodiment of the invention, the drive finger 4 is flexible. By way of a non-limiting example only, this flexible drive finger 4 consists of a second beak 18 extended by at least one elastic coil 20 which ends with means allowing to secure the free end of the elastic coil 20 to the drive wheel 2. According to a particular embodiment of the invention, the elastic coil 20 ends with a radial arm 22 pierced with a hole 24 allowing the flexible drive finger 4 to be inserted on a pivot axis 26 of the drive wheel 2.

Figure 2B:
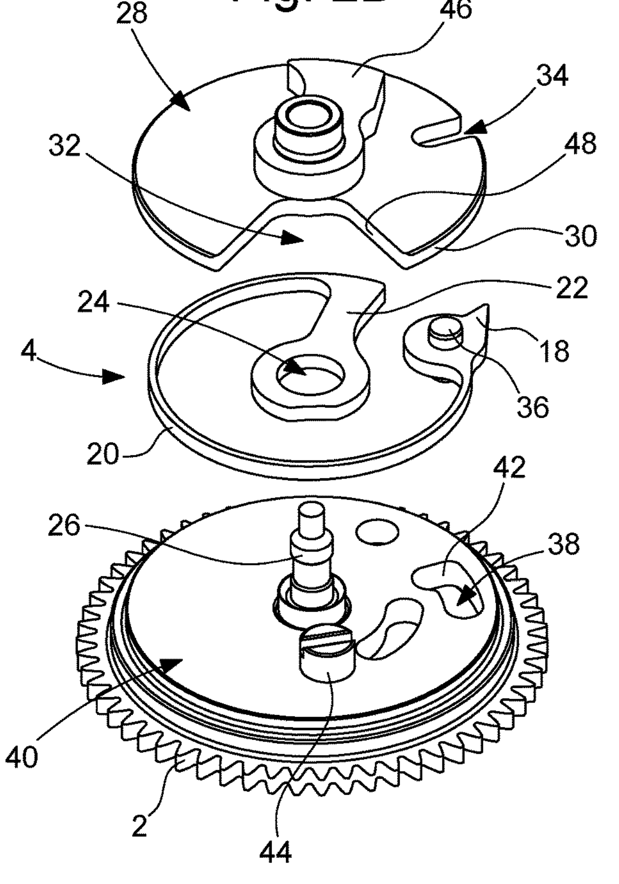
FIG. 2B is a top perspective view of the 24-hour wheel of FIG. 2A in the separate state.
Figure 2A:
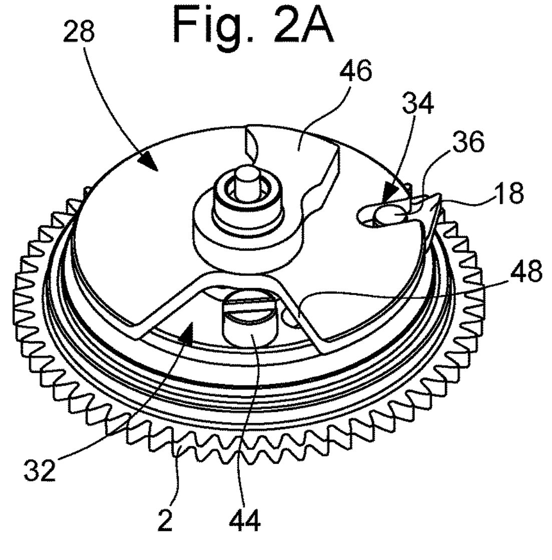
FIG. 2A is a top perspective view of the 24-hour wheel in the mounted state.

As visible in particular in FIGS. 2A and 2B, the flexible drive finger 4 is rotatably mounted coaxially between the drive wheel 2 and a circular plate 28 in a perimeter 30 of which are formed at least one notch 34 and preferably also a clearance 32. A pin 36 is fixed by any suitable technique such as inserting or gluing in the second beak 18 of the flexible drive finger 4. At a first end, the pin 36 protrudes into an oblong hole 38 formed in a board 40 of the drive wheel 2, and at a second end, the pin 36 protrudes into the notch 34 formed in the perimeter 30 of the circular plate 28. The flexible drive finger 4 is mounted on the drive wheel 2 with a slight pre-stress so as to ensure that the first end of the pin 36 is constantly supported against a wall 42 of the oblong hole 38 formed in the board 40 of the drive wheel 2.

The mounting detailed above is completed by an eccentric 44 fixed in the board 40 of the drive wheel 2 so that its angular position can be finely adjusted. On the other hand, the circular plate 28 is mounted rotationally free relative to the drive wheel 2 and is positioned so that the eccentric 44 is in the clearance 32. Finally, the circular plate 28 is surmounted by a cam 46 mounted integrally on this circular plate 28. The role of this cam 46 will be detailed later.

Figure 4:
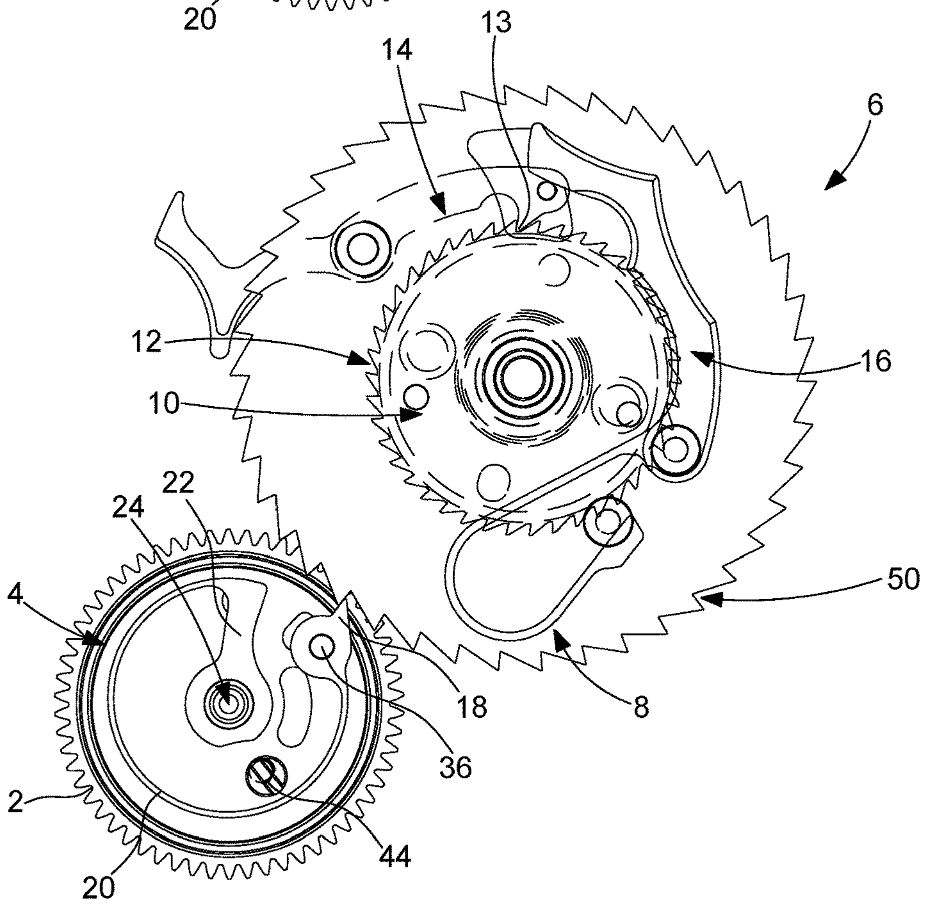
FIG. 4 is a top view of the assembly formed by the 24-hour wheel and by the display wheel as the flexible drive finger of the 24-hour wheel begins to drive the display wheel.

As stated above, the drive wheel 2 performs a complete revolution in 24 hours. In the event that the retrograde timepiece display mechanism 1 is intended to display the date indications, the change in the information displayed, that is to say the date, takes place around midnight. At this time, under the effect of the pivoting of the drive wheel 2 in the counterclockwise direction, the pin 36 is in abutment against the oblong hole 38 and the flexible drive finger 4 which is mounted integrally on the drive wheel 2 at its end opposite its second beak 18 begins to tighten and to drive the circular plate 28 and the cam 46 in pivoting (see FIG. 4). The flexible drive finger 4 is assisted in this by the eccentric 44 which abuts against an edge 48 of the clearance 32. By means of the eccentric 44 and the plate 28, the drive finger 4 drives the display wheel 6. It will be noted that by slightly pivoting the eccentric 44 in one direction or the other, the instant at which the eccentric 44 contacts the circular plate 28 and at which the displayed indication, here the date indication, changes from one value to the immediately following value, is determined with precision.

Figure 5:
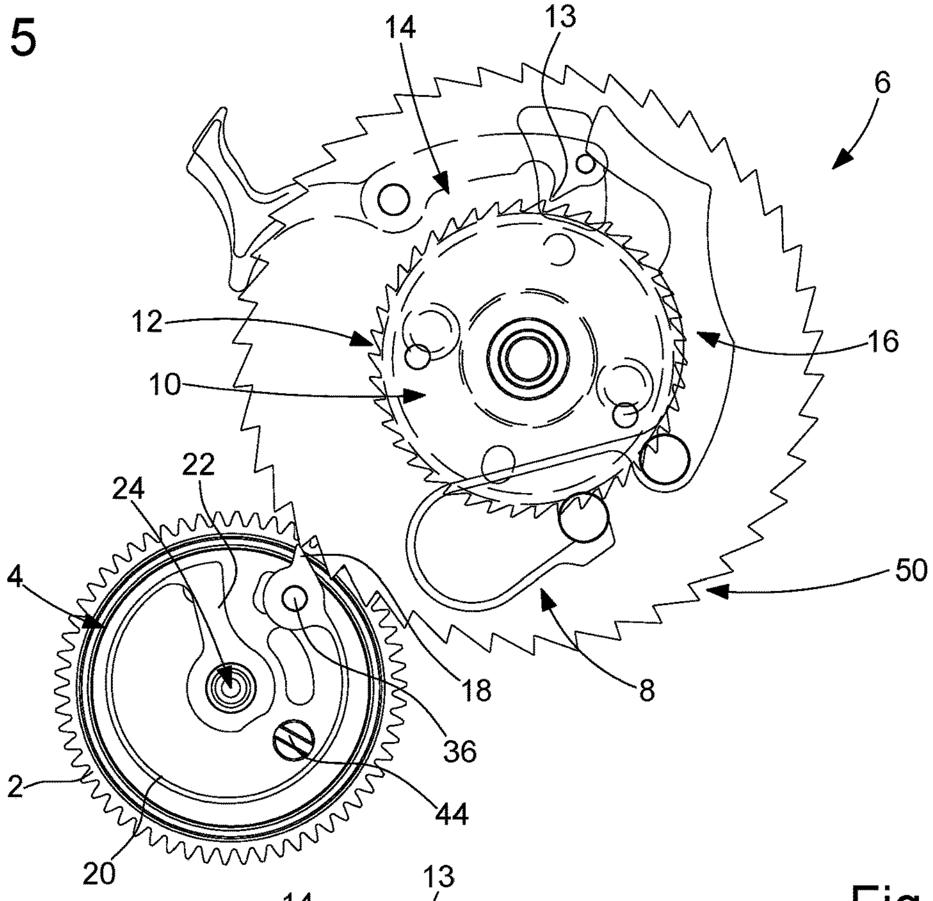
FIG. 5 is a top view of the assembly formed by the 24-hour wheel and by the display wheel at the moment when the flexible drive finger of the 24-hour wheel has moved the display wheel one step forward and is about to escape its engagement with the display wheel.
Figure 6:
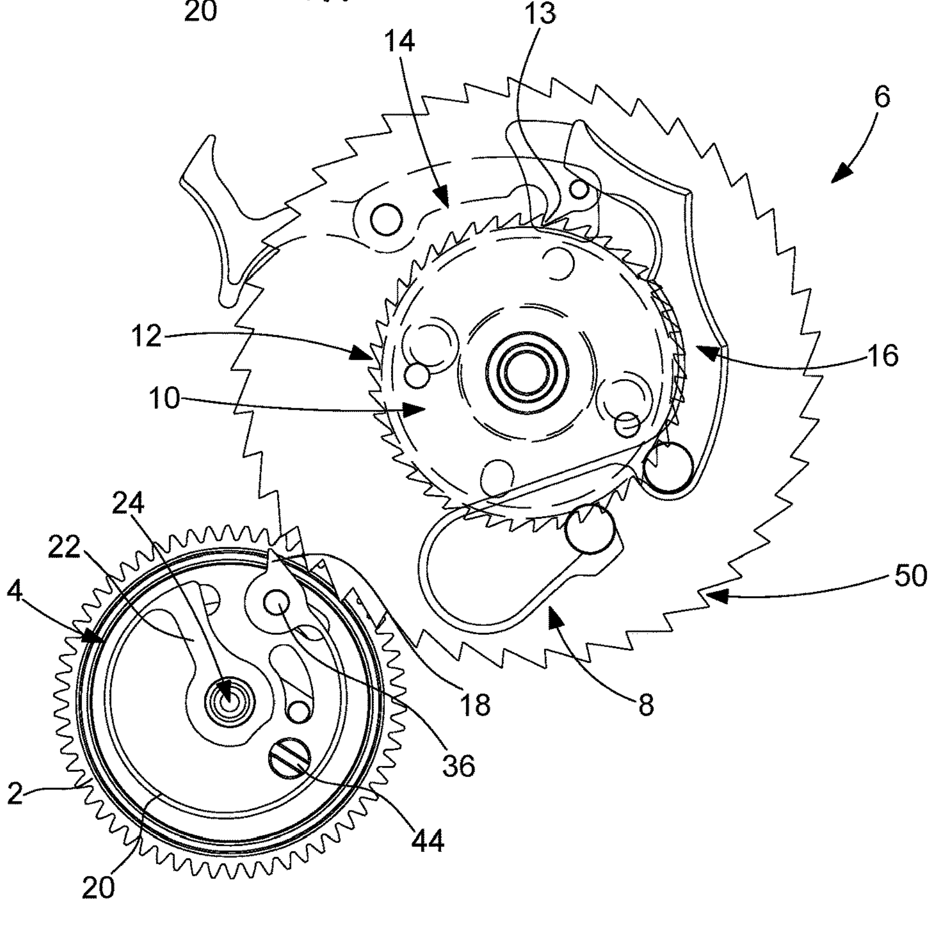
FIG. 6 is a top view of the assembly formed by the 24-hour wheel and by the display wheel at the moment when the flexible drive finger of the 24-hour wheel has finished moving the display wheel one step forward and escaped its engagement with the display wheel.

During this movement, the flexible drive finger 4 causes the display wheel 6 to move one step forward in the clockwise direction by means of its second beak 18 engaged in a toothing 50 of this display wheel 6 (see FIG. 5). This pivoting of the display wheel 6, authorised by the retaining finger 14 which switches from a space between two teeth of the toothing 12 of the wheel 10 to the immediately following space, causes the display to change from one indication to the next indication, for example from a date to the next date. Finally, under the effect of the drive wheel 2 which continues to rotate, the flexible drive finger 4 disengages from its engagement with the toothing 50 of the display wheel 6 and relaxes (see FIG. 6).

At this stage of the description, it is important to remember that if the drive finger 4 is intended to be flexible, it is in order to allow the correction of the current time displayed by the watch wherein the retrograde timepiece display mechanism 1 according to the invention is embedded in both directions. However, the present invention applies identically to the case where the drive finger 4 which engages with the toothing 50 of the display wheel 6 is rigid. The only difference with the case wherein the drive finger 4 is flexible lies in the fact that the correction of the current time displayed by the watch wherein the retrograde timepiece display mechanism 1 according to the invention is embedded can only be done in one direction when the drive finger 4 is rigid.

It is the presence of the drive finger 4 which made it necessary to design a safety device 52 having the purpose of preventing a manual correction, desired by the owner of the watch, of the indication displayed by the retrograde timepiece display mechanism 1 from being performed during the period when the drive finger 4 is engaged with the display wheel 6. Indeed, an attempt to correct the indication provided by the retrograde timepiece display mechanism 1 according to the invention at the moment when the flexible drive finger 4 is engaged with the toothing 50 of the display wheel 6 and produces the change in the information displayed would cause the rotation of the display wheel 6 in the direction opposite to that wherein the flexible drive finger 4 normally drives this display wheel 6, with the risk that the flexible drive finger 4 yields prematurely under the effect of repeated deformations. Thus, thanks to the safety device 52 according to the invention, any risk of driving the display wheel 6 in the direction opposite to the direction wherein the flexible drive finger 4 drives this display wheel 6 during the period of time when these two components engage with each other, and therefore breaking the mechanism, is discarded.

Figure 9:
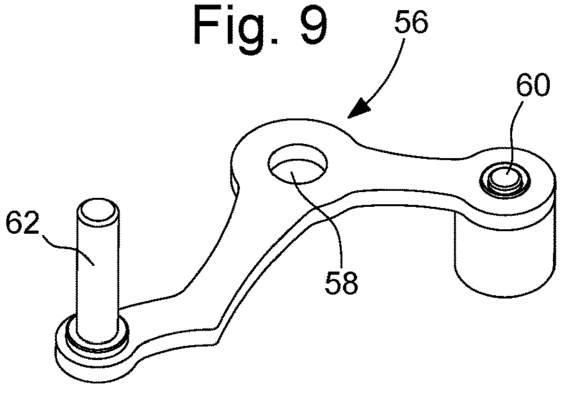
FIG. 9 is a top perspective view of the control lever of the correction device.

The retrograde timepiece display mechanism 1 according to the invention is also equipped with a correction device 54 to allow the owner of the watch to manually correct the indication displayed by this retrograde timepiece display mechanism 1. To this end, the correction device 54 comprises a control lever 56 which pivots in the clockwise direction about a first pivot centre 58 when the owner of the watch pushes on this control lever 56 following arrow A by means of a push button 57. To improve the pressure on the control lever 56, a stud 60 is mounted at a first end of the latter, while at a second end the control lever 56 carries a correction pin 62 (see FIG. 9).

Figure 7:
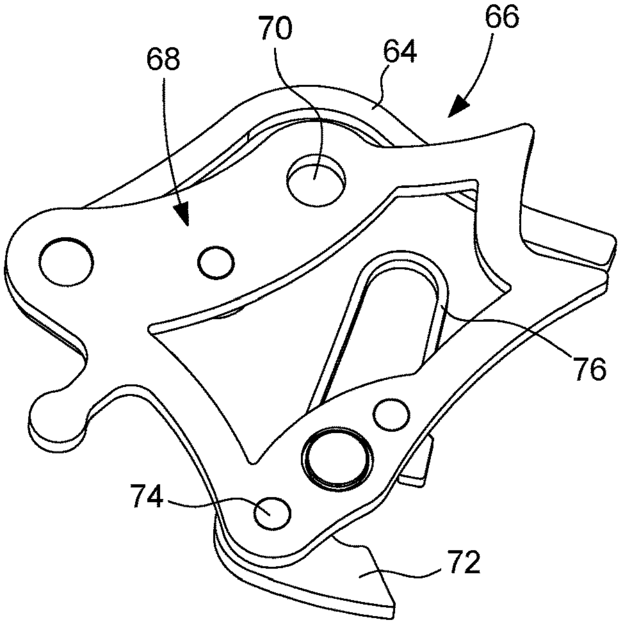
FIG. 7 is a top perspective view of the intermediate correction device that can be actuated by the owner of the watch via the correction device to correct the indication provided by the retrograde timepiece display mechanism according to the invention.
Figure 8:
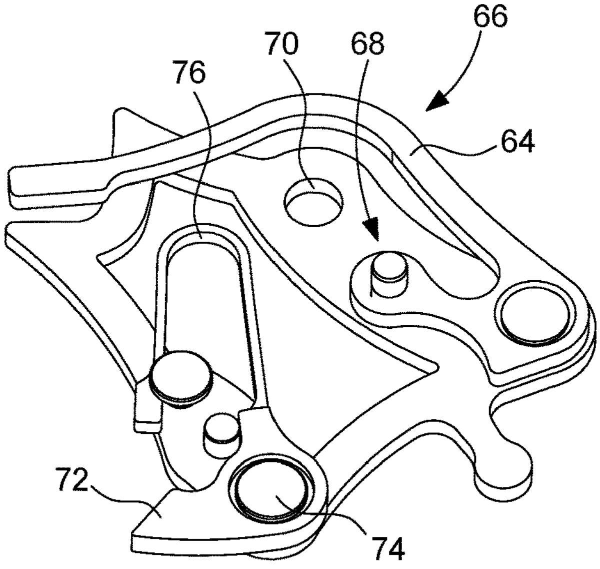
FIG. 8 is a bottom perspective view of the intermediate correction device shown in FIG. 7.
Figure 10:
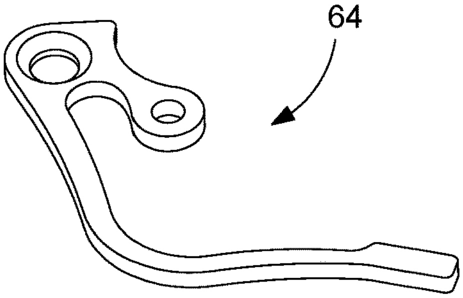
FIG. 10 is a top perspective view of the third spring fixed to the correction lever of the intermediate correction device.

When the owner of the watch pushes the control lever 56 through the stud 60, the control lever 56 pivots about the first pivot centre 58 and moves a third spring 64 away from its rest position via the correction pin 62. This third spring 64 belongs to an intermediate correction device 66 which comprises a correction lever 68 of which the third spring 64 is integral and which is capable of pivoting in the anti-clockwise direction about a second pivot centre 70 (see FIGS. 7, 8 and 10). The intermediate correction device 66 also comprises a correction finger 72 able to pivot about a third pivot centre 74 and elastically stressed by a fourth spring 76 which, preferably but in a non-limiting manner, is made integrally with the correction finger 72. This fourth spring 76 is mounted with a slight elastic pre-stress by means of a pin 77 which keeps it away from its rest position. This fourth spring 76 elastically stresses the correction finger 72 in the clockwise direction, so as to keep this correction finger 72 away from the toothing 50 of the display wheel 6 in normal times. In its position away from the toothing 50 of the display wheel 6, the correction finger 72 is supported against an abutment 79.

Figure 11:
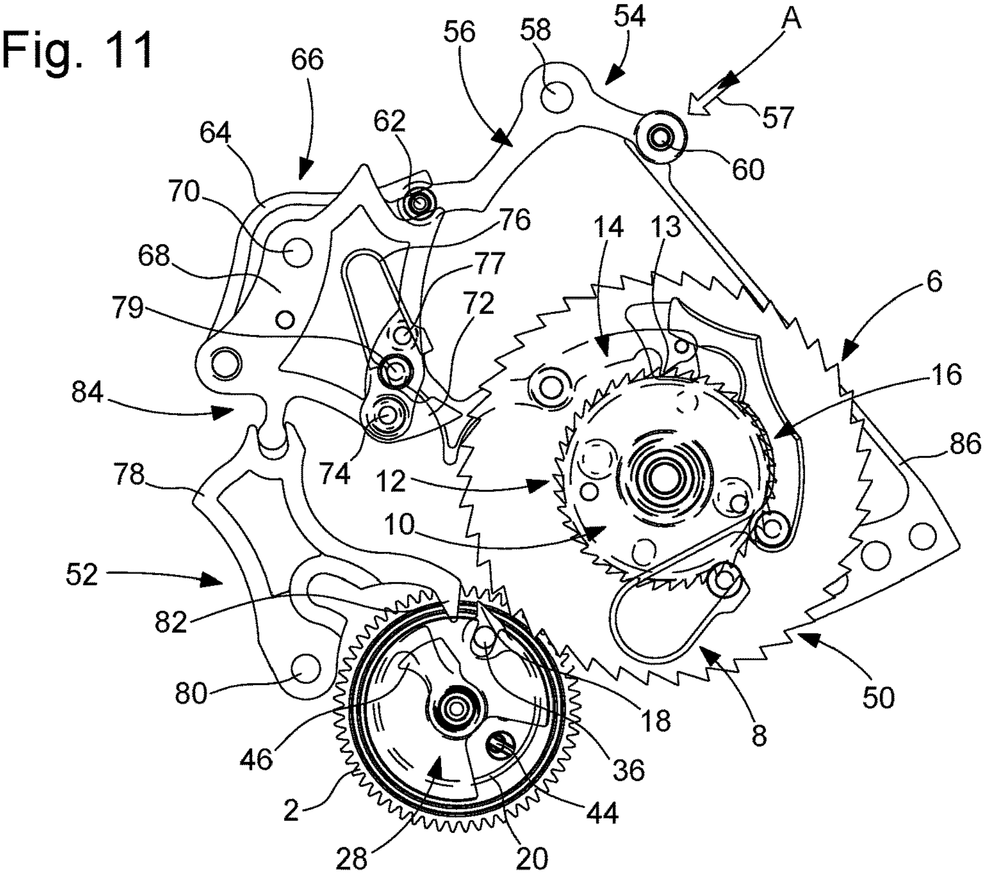
FIG. 11 is a top view of the retrograde timepiece display mechanism according to the invention in the position that this retrograde timepiece display mechanism occupies when the correction device is not operated by the owner of the watch.
Figure 12:
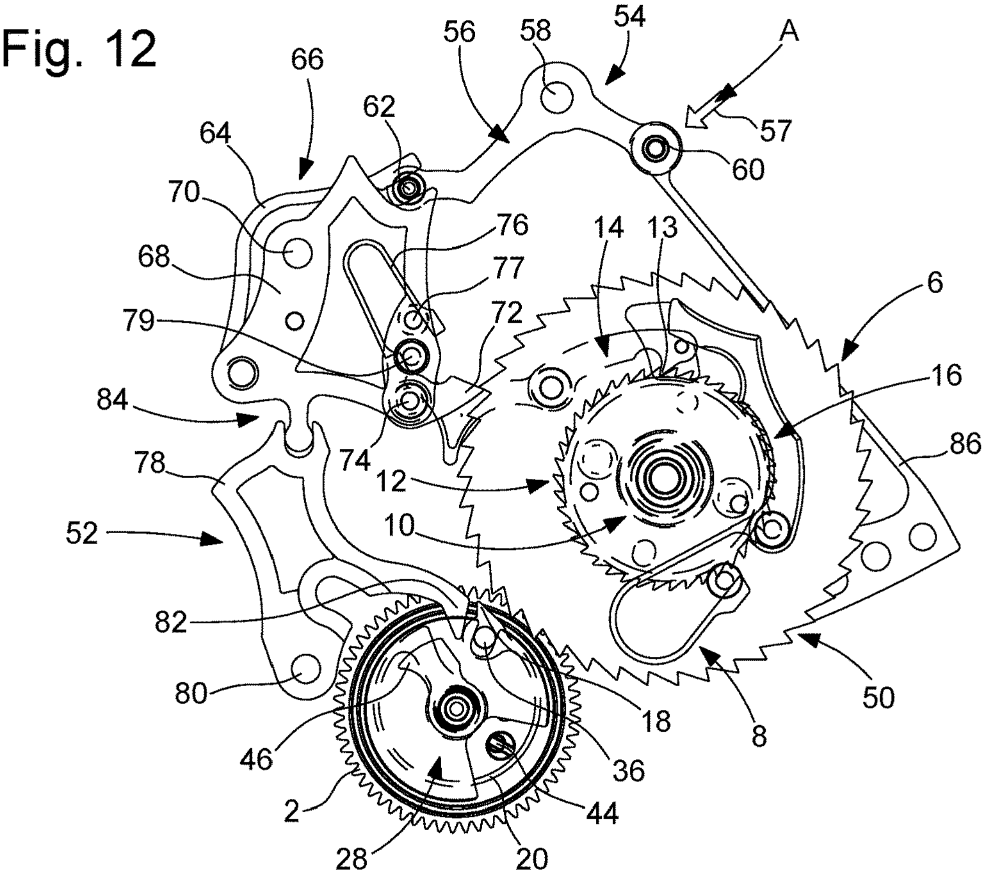
FIG. 12 is a top view of the retrograde timepiece display mechanism according to the invention in the position that this retrograde timepiece display mechanism occupies when the correction device has just been actuated by the owner of the watch and the correction finger begins to engage with the toothing of the display wheel.
Figure 13:
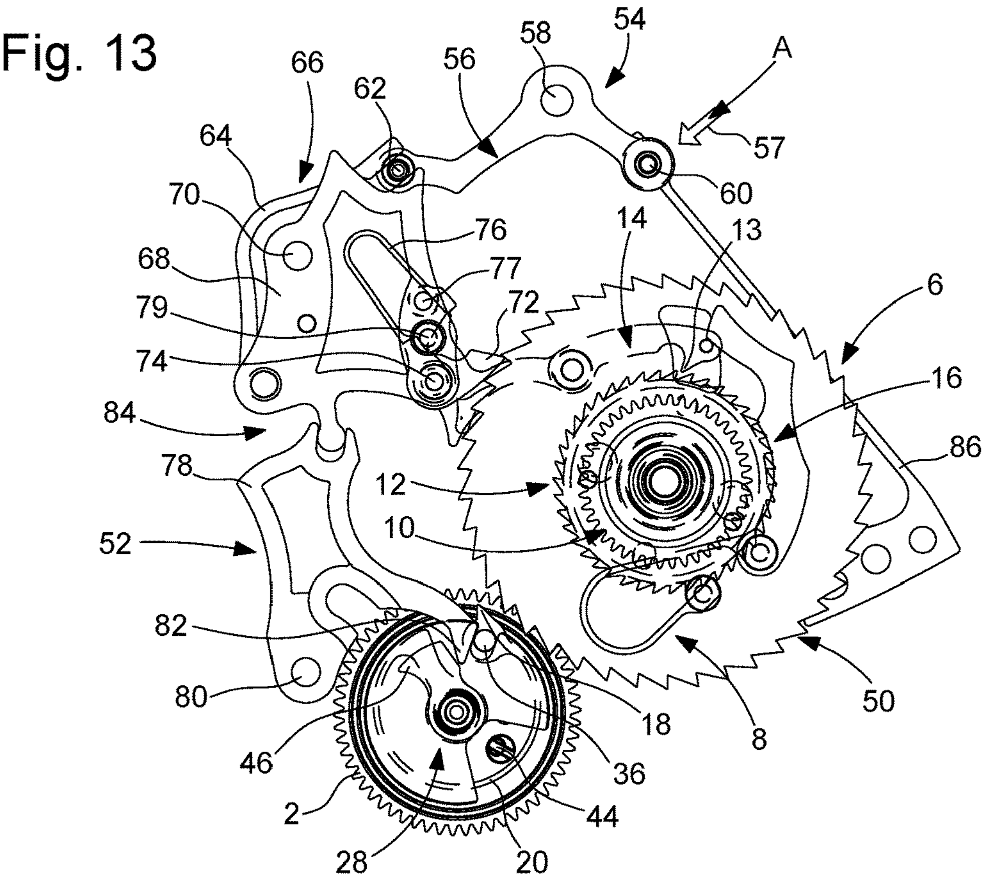
FIG. 13 is a top view of the retrograde timepiece display mechanism according to the invention in the position that this retrograde timepiece display mechanism occupies when the correction finger is engaged with the toothing of the display wheel to correct the displayed indication.
Figure 14:
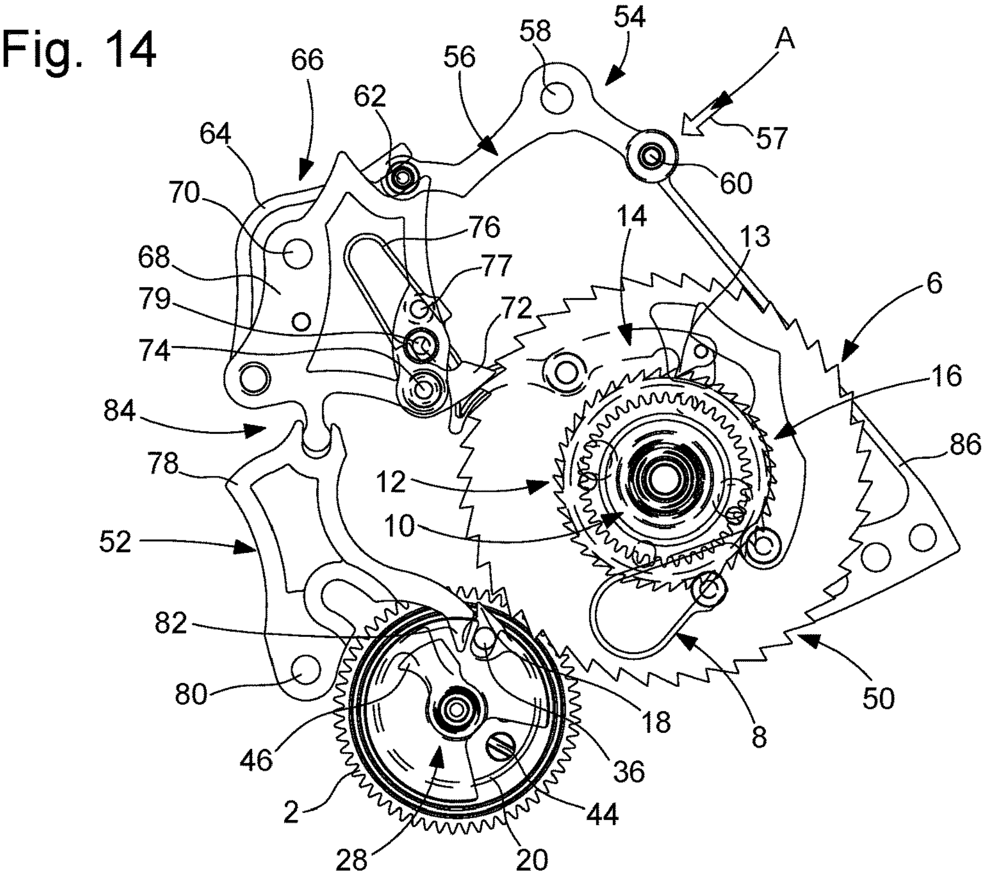
FIG. 14 is a top view of the retrograde timepiece display mechanism according to the invention in the position that this retrograde timepiece display mechanism occupies when the owner of the watch releases pressure on the push button.
Figure 15:
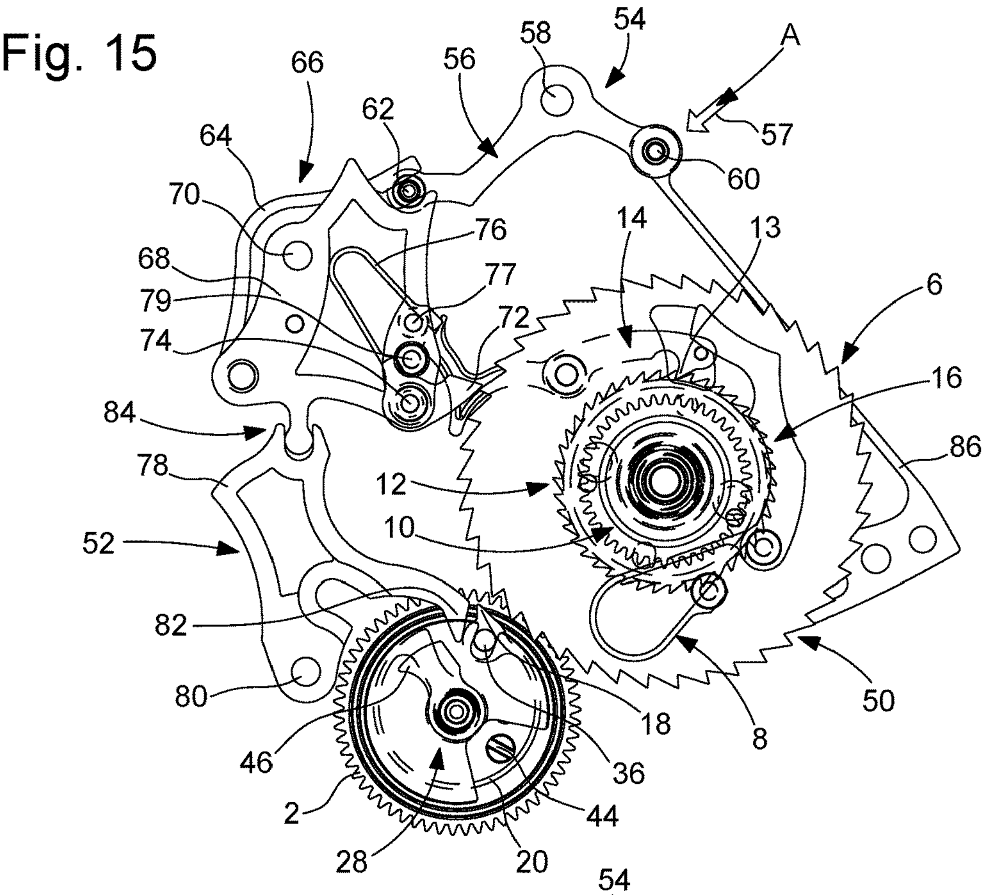
FIG. 15 is a top view of the retrograde timepiece display mechanism according to the invention in the position that this retrograde timepiece display mechanism occupies when the correction finger is released from its engagement with the toothing of the display wheel.
Figure 16:
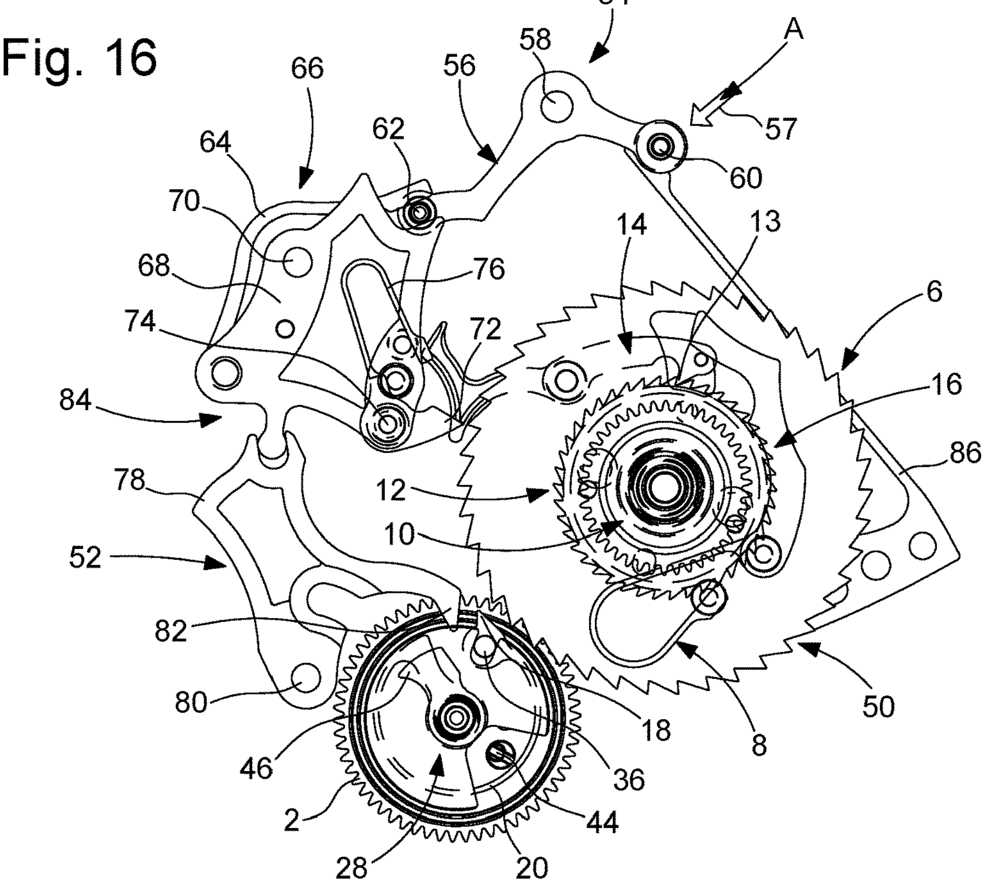
FIG. 16 is a top view which illustrates the position of the retrograde timepiece display mechanism according to the invention when the correction is completed.

The operation of the intermediate correction device 66 is as follows: when the owner of the watch wants to correct the indication displayed by the retrograde timepiece display mechanism 1, he presses the push button 57, which has the effect of rotating the control lever 56 in the clockwise direction (see FIG. 11). Under the effect of the pivoting of the control lever 56, the correction pin 62 moves the third spring 64 away from its rest position and causes the pivoting of the correction lever 68 in the counterclockwise direction. By pivoting, the correction lever 68 pivots the correction finger 72 in the counterclockwise direction against the elastic return force of the fourth spring 76, so that the correction finger 72 moves the display wheel 6 one step forward (FIG. 12). When the owner of the watch releases the pressure on the push button 57, the correction finger 72 gradually disengages from the toothing 50 of the display wheel 6 as can be seen in FIGS. 13 to 16.

Finally, the safety device 52 comprises a fork 78 pivotally mounted about a fourth pivot centre 80 and which is provided with a feeler-spindle 82. This safety device 52 is coupled to the intermediate correction device 66 via an articulation 84 for example of a ball joint type. It will be noted that as a particular embodiment of the invention, the correction lever 68 and the fork 78 can be made in one piece.

Figure 17:
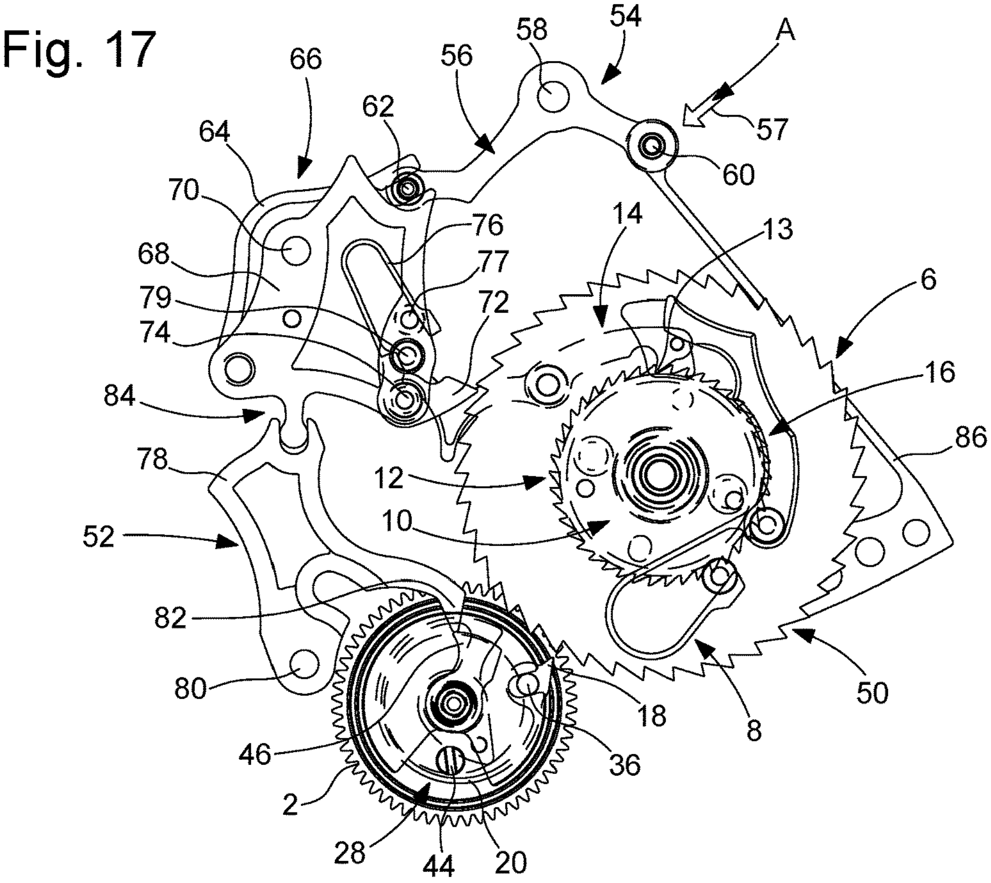
FIG. 17 is a top view which illustrates the position of the retrograde timepiece display mechanism according to the invention when the safety device is activated in order to prevent any manual correction ordered by the owner of the watch when the flexible drive finger is engaged with the display wheel.
Figure 18:
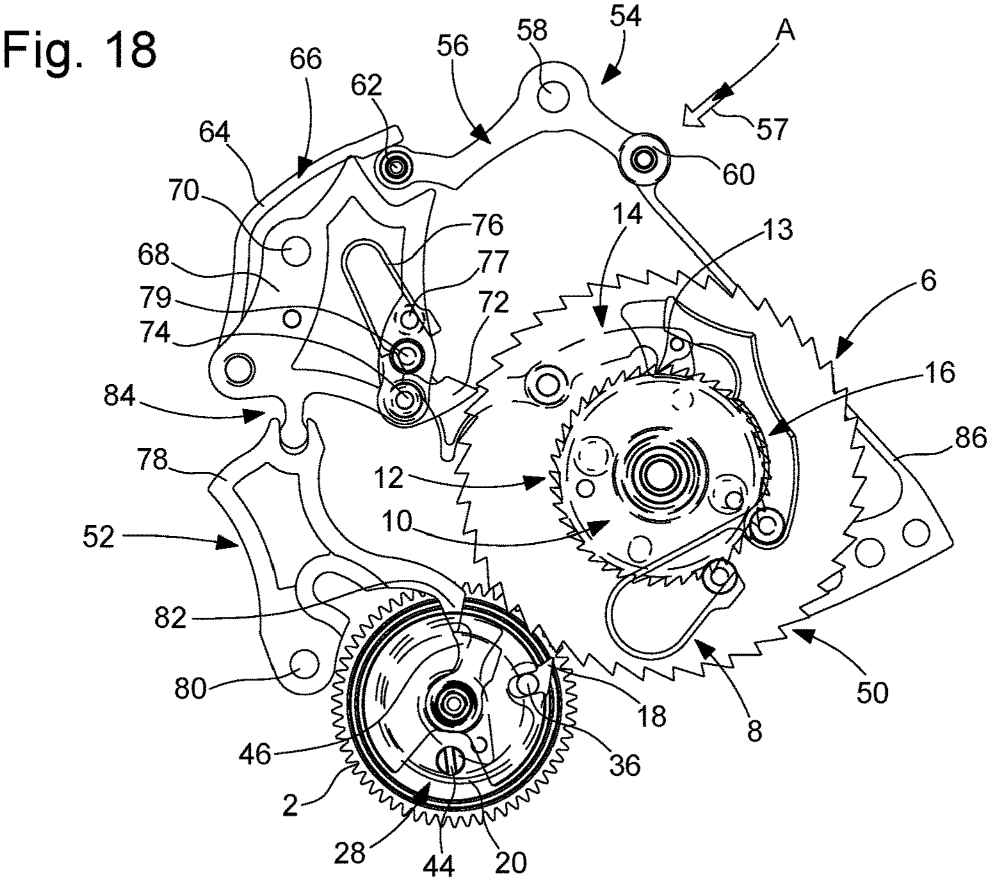
FIG. 18 is a view similar to that of FIG. 17 which illustrates the situation wherein the owner of the watch attempts to forcefully correct the information displayed by the retrograde timepiece display mechanism according to the invention while the horological movement drives this retrograde timepiece display mechanism to change the information displayed and the manual correction mechanism is therefore blocked.

In accordance with the invention and as shown in FIG. 17, the correction device 54, the intermediate correction device 66 and the safety device 52 together form a linkage which is arranged so that when the flexible drive finger 4 is engaged with the toothing 50 of the display wheel 6 and that the owner of the watch simultaneously presses the push button 57 to attempt to correct the indication provided by the retrograde timepiece display mechanism 1 according to the invention, the feeler-spindle 82 rests against the cam 46. The whole of this linkage is thus momentarily blocked and a pressure exerted by the owner of the watch on the control lever 56 remains ineffective thanks to the third spring 64 which stretches to tolerate additional pivoting of the control lever 56. Indeed, if reference is made to FIG. 18 which corresponds to the situation where the user continues to exert pressure on the push button 57, it can be seen that the feeler-spindle 82 remains in contact with the cam 46, so that the correction lever 68 and the fork 78 do not move either. Consequently, continuing to press the push button 57 causes the control lever 56 to pivot in the clockwise direction against the elastic return force of a fifth spring 86 whose function is to elastically stress this control lever 56. By pivoting, the control lever 56 drives with it the correction pin 62 which leaves its contact with the correction lever 68 by going against the elastic return force of the third spring 64. Thus, even in the case where the owner of the watch attempts to manually correct the retrograde timepiece display mechanism according to the invention during the period of time when the horological movement drives this retrograde timepiece display mechanism 1 to change the information displayed and where the manual correction mechanism comprising the correction lever 68 and the fork 78 is therefore blocked, this manual correction mechanism is protected against any risk of being forced and damaged by the owner.

As a result, when the flexible drive finger 4 disengages from the toothing 50 of the display wheel 6, it suddenly relaxes and pivots the circular plate 28 as well as the cam 46. The feeler-spindle 82 thus loses its support with the cam 46, which frees the linkage formed by the correction device 54, the intermediate correction device 66 and the safety device 52, and again allows to correct the indication provided by the retrograde timepiece display mechanism 1 by pressing the push button 57.

It goes without saying that the present invention is not limited to the embodiment which has just been described and that various modifications and simple variants can be considered by the person skilled in the art without departing from the scope of the invention as defined by the appended claims. It will be understood in particular that it is not essential for the correction finger 72 to be elastic and to be stressed by the fourth spring 76. This solution is only dictated by considerations on the size of the retrograde timepiece display mechanism 1, the fact that the correction finger 72 can be retracted, indeed allowing a space saving. Nevertheless, the correction finger 72 can just as well be rigid, without this jeopardising the operating principles of the intermediate correction device 66. Likewise, as already mentioned above, the drive finger 4 can be either flexible or rigid, without this affecting the retrograde timepiece display mechanism 1 according to the invention. Indeed, the only notable difference in the case where the drive finger 4 is rigid lies in the fact that the correction of the current time displayed by the watch wherein the retrograde timepiece display mechanism 1 is embedded can only be performed in one direction. Indeed, it is understood that when the owner of the watch corrects the current time, this has the effect of rotating the drive wheel 2 in order to avoid any risk of desynchronisation between the display of the current time and the display of the indication provided by the retrograde timepiece display mechanism 1. Therefore, when the drive finger 4 is rigid, it means that it is fixedly mounted on the drive wheel 2, so that this drive wheel cannot rotate against the direction wherein it rotates when it drives the display wheel 6 via the drive finger 4.

NOMENCLATURE

1. Retrograde timepiece display mechanism
2. Drive wheel
4. Drive finger
6. Display wheel
8. Second spring
10. Wheel
12. Toothing
13. First beak
14. Retaining finger
16. Jumper
18. Second beak
20. Elastic coil
22. Radial arm
24. Hole
26. Pivot axis
28. Circular plate
30. Perimeter
32. Clearance
34. Notch
36. Pin
38. Oblong hole
40. Board
42. Wall
44. Eccentric
46. Cam
48. Edge
50. Toothing
52. Safety device
54. Correction device
56. Control lever
Arrow A
57. Push button
58. First pivot centre
60. Stud
62. Correction pin
64. Third spring
66. Intermediate correction device
68. Correction lever
70. Second pivot centre
72. Correction finger
74. Third pivot centre
76. Fourth spring
77. Pin
78. Pivoting fork
79. Abutment
80. Fourth pivot centre
82. Feeler-spindle
84. Ball joint-type articulation
86. Fifth spring

The invention claimed is:

1. A retrograde timepiece display mechanism for a watch comprising a wheel for displaying information, said display wheel being driven at regular time intervals by a drive finger carried by a drive wheel in turn driven by a horological movement, in order to change information displayed by the retrograde timepiece display mechanism from one value to an immediately following value, said retrograde timepiece display mechanism comprising also an intermediate correction device which allows to manually correct the information provided by the retrograde timepiece display mechanism by acting on a correction finger which drives the display wheel, the retrograde timepiece display mechanism also comprising a safety device arranged to allow blocking the intermediate correction device by preventing the correction finger from driving the display wheel during a period of time when the change in the information displayed by the retrograde timepiece display mechanism occurs and when the drive finger is engaged with the display wheel.

2. The retrograde timepiece display mechanism according to claim 1, wherein the display wheel is elastically stressed in a direction opposite to a driving direction of the display wheel by a first spring, said elastic stress being retained with a wheel mounted fixedly coaxially with the display wheel and into a toothing of which a retaining means mounted on the display wheel is elastically pressed.

3. The retrograde timepiece display mechanism according to claim 2, wherein the retaining means is a jumper elastically stressed by a second spring and provided with a beak which is pressed into the toothing of the display wheel.

4. The retrograde timepiece display mechanism according to claim 3, wherein the drive finger is flexible.

5. The retrograde timepiece display mechanism according to claim 4, wherein the drive finger consists of a beak engaged in a toothing of the display wheel and extended by at least one elastic coil which ends in means allowing a free end of the elastic coil to be secured to the drive wheel which carries the drive finger.

6. The retrograde timepiece display mechanism according to claim 5, further comprising drive finger fixing means that comprise a radial arm pierced with a hole allowing the flexible drive finger to be secured to a pivot axis of the drive wheel which carries the flexible drive finger.

7. The retrograde timepiece display mechanism according to claim 2, wherein the retaining means is a retaining finger elastically stressed by a jumper and provided with a beak which is pressed into the toothing of the display wheel.

8. The retrograde timepiece display mechanism according to claim 2, wherein the drive finger is flexible.

9. The retrograde timepiece display mechanism according to claim 8, wherein the drive finger consists of a beak engaged in a toothing of the display wheel and extended by at least one elastic coil which ends in means allowing a free end of the elastic coil to be secured to the drive wheel which carries the drive finger.

10. The retrograde timepiece display mechanism according to claim 9, further comprising drive finger fixing means that comprise a radial arm pierced with a hole allowing the flexible drive finger to be secured to a pivot axis of the drive wheel which carries the flexible drive finger.

11. The retrograde timepiece display mechanism according to claim 1, wherein the drive finger is flexible.

12. The retrograde timepiece display mechanism according to claim 11, wherein the drive finger consists of a beak engaged in a toothing of the display wheel and extended by at least one elastic coil which ends in means allowing a free end of the elastic coil to be secured to the drive wheel which carries the drive finger.

13. The retrograde timepiece display mechanism according to claim 12, further comprising drive finger fixing means that comprise a radial arm pierced with a hole allowing the flexible drive finger to be secured to a pivot axis of the drive wheel which carries the flexible drive finger.

14. The retrograde timepiece display mechanism according to claim 13, wherein the flexible drive finger is mounted coaxially between the drive wheel and a circular plate freely mounted on the drive wheel and in a perimeter of which a notch is formed, and wherein a pin is fixed in the beak of the flexible drive finger, said pin protruding, at a first end, in an oblong hole formed in a board of the drive wheel, and at a second end, in the notch.

15. The retrograde timepiece display mechanism according to claim 14, wherein the flexible drive finger is mounted on the drive wheel pre-stressed so that the pin is constantly bearing against a wall of the oblong hole.

16. The retrograde timepiece display mechanism according to claim 15, wherein an eccentric is fixed in the board of the drive wheel so that a position of the eccentric can be adjusted and positioned so that it ends up in a clearance formed in the perimeter of the circular plate.

17. The retrograde timepiece display mechanism according to claim 14, wherein an eccentric is fixed in the board of the drive wheel so that a position of the eccentric can be adjusted and positioned so that it ends up in a clearance formed in the perimeter of the circular plate.

18. The retrograde timepiece display mechanism according to claim 12, wherein the flexible drive finger is mounted coaxially between the drive wheel and a circular plate freely mounted on the drive wheel and in a perimeter of which a notch is formed, and in that a pin is fixed in the beak of the flexible drive finger, said pin protruding, at a first end, in an oblong hole formed in a board of the drive wheel, and at a second end, in the notch.

19. The retrograde timepiece display mechanism according to claim 18, wherein an eccentric is fixed in the board of the drive wheel so that a position of the eccentric can be adjusted and positioned so that it ends up in a clearance formed in the perimeter of the circular plate.

20. The retrograde timepiece display mechanism according to claim 18, wherein the circular plate is surmounted by a cam mounted integral on said circular plate, a feeler-spindle of the safety device bearing against said cam to make impossible any attempt of manual correction of the information displayed by the retrograde timepiece display mechanism when the flexible drive finger is engaged with the display wheel and the intermediate correction device is simultaneously actuated.

21. The retrograde timepiece display mechanism according to claim 20, further comprising a correction device which, when actuated, acts on the intermediate correction device so that the correction finger engages in the toothing of the display wheel and moves the latter forward only when the flexible drive finger is not engaged with the display wheel.

22. The retrograde timepiece display mechanism according to claim 21, wherein the correction device comprises a control lever which pivots when said control lever is pushed on, said control lever being provided with a correction pin which moves a third spring of the intermediate correction device away from a rest position, said third spring being fixed on a correction lever which, by pivoting, in turn rotates the correction finger against an elastic return force of a fourth spring, so that the correction finger moves the display wheel forward only when the flexible drive finger is not engaged with the display wheel, the safety device comprising a pivotally mounted fork to which the correction lever is coupled and which is provided with the feeler-spindle.

23. The retrograde timepiece display mechanism according to claim 20, wherein the correction device comprises a control lever which pivots when said control lever is pushed on, said control lever being provided with a correction pin which moves a third spring of the intermediate correction device away from a rest position, said third spring being fixed on a correction lever which, by pivoting, in turn rotates the correction finger against an elastic return force of a fourth spring, so that the correction finger moves the display wheel forward only when the flexible drive finger is not engaged with the display wheel, the safety device comprising a pivotally mounted fork to which the correction lever is coupled and which is provided with the feeler-spindle.

24. The retrograde timepiece display mechanism according to claim 1, wherein the drive wheel which carries the drive finger is a 24-hour wheel, and wherein the retrograde timepiece display mechanism allows to display date indications.

25. The retrograde timepiece display mechanism according to claim 1, wherein the drive finger is rigid.

* * * * *